US012126083B2

(12) United States Patent
Woolman et al.

(10) Patent No.: US 12,126,083 B2
(45) Date of Patent: Oct. 22, 2024

(54) STRETCHED FOAMLESS MULTI-LAYER SUBSTRATE POLARIZER AND METHODS FOR FABRICATING SAME

(71) Applicant: ThinKom Solutions, Inc., Hawthorne, CA (US)

(72) Inventors: Jason Woolman, Signal Hill, CA (US); David Hiley, Los Angeles, CA (US)

(73) Assignee: ThinKom Solutions, Inc., Hawthorne, CA (US)

( * ) Notice: Subject to any disclaimer, the term of this patent is extended or adjusted under 35 U.S.C. 154(b) by 135 days.

(21) Appl. No.: 17/555,833

(22) Filed: Dec. 20, 2021

(65) Prior Publication Data

US 2023/0198160 A1 Jun. 22, 2023

(51) Int. Cl.
*H01Q 15/24* (2006.01)

(52) U.S. Cl.
CPC .................................. *H01Q 15/242* (2013.01)

(58) Field of Classification Search
CPC .. H01Q 15/0026; H01Q 15/242; H01Q 15/24; G02B 5/30
See application file for complete search history.

(56) References Cited

U.S. PATENT DOCUMENTS 5,467,100 A * 11/1995 Chen .................... H01Q 15/242 343/756
7,561,332 B2 * 7/2009 Little ................... G02B 5/3058 349/1
7,773,292 B2 * 8/2010 Lynch ....................... H01Q 3/46 385/11
2003/0214456 A1 * 11/2003 Lynch ................ H01Q 15/0026 343/753
2016/0124131 A1 * 5/2016 Kobayashi ........... G02B 5/3016 428/141
2019/0121195 A1 * 4/2019 Kitabayashi .............. G02F 1/13
2020/0313303 A1 * 10/2020 Milroy ................... H01Q 13/28

OTHER PUBLICATIONS

Extended European Search Report dated May 15, 2023 from related/corresponding European Patent Appl. No. 22212279.8.

* cited by examiner

*Primary Examiner* — Dameon E Levi
*Assistant Examiner* — Leah Rosenberg
(74) *Attorney, Agent, or Firm* — KUSNER & JAFFE

(57) ABSTRACT

A radio frequency (RF) polarizer includes a frame having a first side and a second side spaced apart from and opposite the first side, a first polarizer substrate attached to the first side and including a plurality of conductor patterns formed on a surface of the first polarizer substrate, and a second polarizer substrate attached to the second side. The first polarizer substrate and the second polarizer substrate are attached to the first side and the second side, respectively, under tension.

24 Claims, 4 Drawing Sheets

STRETCHED FOAMLESS MULTI-LAYER SUBSTRATE POLARIZER AND METHODS FOR FABRICATING SAME

TECHNICAL FIELD

The present invention relates generally to polarizers, and more particularly, to polarizers for use with continuous transverse stub (CTS) and variable inclination continuous transverse stub (VICTS) antenna systems.

BACKGROUND ART

A multi-layer meanderline polarizer is a device that, when added to the radiating face of an aperture antenna, achieves various polarization states by converting the (usually linear) polarization emanating from the aperture to another polarization state (usually circular polarization). A meanderline polarizer is generically defined as a passive RF structure that includes two or more thin dielectric substrate layers, upon each of which is printed/etched a one-dimensional array of parallel conductive "meandering" ("square-wave-like") trace/patterns such that each layer exhibits anisotropic (polarization-orientation-dependent) properties. The RF insertion phase (phase difference between incident and transmitted waves) for the component of an incident linear polarization plane wave aligned parallel to the axis of the meanderline favorably differs from the RF insertion phase for the incident plane wave component aligned orthogonal to the meanderline axes. Based on this phase differential, multiple layers are employed to achieve the desired net differential phase (typically 90 degrees for linear-to-circular polarizer applications.)

A grid-type, or "gridline", polarizer is a device that when added to the radiating face of an aperture antenna achieves various polarization states by converting the (usually linear) polarization emanating from the aperture to another polarization state (usually rotated linear polarization). A gridline polarizer is generically defined as a passive RF structure that includes one or more thin dielectric substrate layers, upon each of which is printed/etched a closely spaced (e.g., ¼ wavelength or less) one-dimensional array of parallel conductive lines such that the/each layer exhibits anisotropic (polarization-orientation-dependent) properties. Incident waves with linear polarization aligned parallel to the conductive lines are highly (95% or more) reflected (i.e. 5% or less transmitted) whereas incident waves with linear polarization aligned orthogonal to the conductive lines are largely (95% or more) transmitted (i.e. 5% or less reflected.) Additional information concerning meanderline and gridline polarizers can be found in U.S. patent application Ser. No. 16/369,483 filed on Mar. 29, 2019, the contents of which is hereby incorporated by reference in its entirety.

Polarizers used with low profile antennas are designed to be relatively thin to minimize the impact to the overall antenna height. As polarizers become large in diameter with a thin cross-section, issues begin to arise such as achieving a flat structure in manufacturing as well as maintaining flatness during operation within the antenna. To achieve and maintain flatness within the antenna, conventional polarizers are typically supported around the perimeter. For larger diameter polarizers, a small center support may also be included.

Conventional polarizer construction, in its simplest form, utilizes a composite "sandwich" construction having a semi-rigid foam spacer bonded between two dielectric substrate face sheets, at least one having gridline or meanderline geometries. More complex forms utilize two or more foam spacers to separate 3 or more dielectric substrate layers. These polarizers tend to be circular in shape and quite thin compared to their diameter (e.g., 30-inch diameter by 0.100-inch thick would not be unusual). These polarizers are typically supported on their perimeter by a flat circular ring, and sometimes they are supported in the center. These polarizers rely solely on their inherent stiffness to maintain the required flatness, and this can result in undesired flexure (convex and concave) bowing of the structure under mechanical vibration and shock and over temperature, which is undesirable.

More particularly, the composite sandwich construction has several issues. In particular, the composite sandwich polarizer can be difficult to manufacture with the required flatness to satisfy RF requirements. This is particularly true for large diameter (~30 inch) relatively thin (0.10 inch) configurations. Additionally, the composite sandwich construction is subject to distortions due to the method of attachment to mating parts and in particular from the manner in which the composite sandwich is retained on the perimeter ring. More particularly, the composite sandwich polarizer must be held against a flat perimeter ring with enough force to maintain its flatness, and this must be achieved in an operating environment where there is differential thermal expansion between the perimeter ring, typically made from metal, and the non-metal polarizer. This is a delicate balance that is difficult to achieve in practice, as the composite sandwich configuration cannot tolerate in-plane restraining forces, which tend to buckle and bend the polarizer. Further, the composite sandwich construction experiences dielectric loss through the foam spacer and adhesive layers used to assemble the polarizer, and machining and precision control of the foam thickness can be complex and expensive.

SUMMARY OF INVENTION

During operation, antennas can experience large temperature swings, which can lead to temperature gradients throughout the polarizer structure. These gradients can cause the polarizer to distort and warp, which can result in reduced antenna performance, unwanted interference, and in cases where the polarizer is rotated or moved with respect to other parts of the antenna, wear of the polarizer against those other parts of the antenna. In multi-layer polarizer embodiments, undesired wear and friction between individual polarizer surfaces (which rotate relative to each other) can also occur.

Antenna efficiency is an important characteristic when describing the performance of an antenna and is a function of the losses (signal attenuation) within the antenna. To achieve high efficiency, a goal is to minimize losses, which are in part due to the materials used within the antenna.

According to aspects of the present invention, dielectric substrate membranes that are either blank or support geometries (e.g., gridline and meanderline geometries) are stretched during assembly such that they remain entirely flat under all operational conditions. These pre-tensioned dielectric substrate membranes maintain polarizer flatness and minimize dielectric losses. More particularly, the stretched dielectric membranes provide sufficient support to the structure such that intermediate supporting foam spacers and adhesive layers can be eliminated. The elimination of foam spacers and adhesives directly improves antenna performance by reducing dielectric losses internal to the antenna, and also obviates any concerns with respect to moisture entrapment or outgassing that is associated with conventional "bonded foam" embodiments. Similarly, the elimination of the traditional bonded multi-layer laminated structures, which are conventionally comprised of multiple layers of inherently different materials, each with its own unique coefficient of thermal expansion, thereby eliminates the thermally-induced "warping" (deformation) as is common in such bonded/laminated inhomogeneous structures when used over wide temperature ranges.

Two (or more) pre-tensioned non-contacting homogenous dielectric substrate membranes may be assembled together with a supporting ring to form a polarizer embodiment in which two layers are required for proper RF performance. Traditional mechanical and thermal induced distortion to the polarizer flatness is overcome through the "pre-tensioning" and the absence of the physical foam and adhesive layers. Additional thin substrate layers (1-3 mils in thickness) may be added as required with various combinations of supporting rings and dielectric substrate membranes to achieve desired polarization orientation and isolation.

According to one aspect of the invention, a radio frequency (RF) polarizer includes: a frame having a first side and a second side spaced apart from and opposite the first side; a first polarizer substrate attached to the first side and including a plurality of conductor patterns formed on a surface of the first polarizer substrate; and a second polarizer substrate attached to the second side, wherein the first polarizer substrate and the second polarizer substrate are attached to the first side and the second side, respectively, under tension.

According to another aspect of the invention, a radio frequency (RF) polarizer includes: a frame having a first side and a second side spaced apart from and opposite the first side; a first polarizer substrate attached to the first side and including a plurality of conductor patterns formed on a surface of the first polarizer substrate; and a second polarizer substrate attached to the second side, wherein an inner-most planar surface of the first polarizer substrate and an inner-most planar surface of the second polarizer substrate face each other, and exposed portions of the respective inner-most planar surfaces are structurally independent of each other.

In one embodiment, the conductor patterns are formed on an outer-most surface of at least the first polarizer substrate.

In one embodiment, the plurality of conductor patterns comprise at least one of meanderline geometries or gridline geometries.

In one embodiment, the first polarizer substrate is fixed to the first side of the frame at a first tension, and the second polarizer substrate is fixed to the second side of the frame at a second tension, the first tension substantially the same as the second tension.

In one embodiment, the first and second tension are about 2000 psi.

In one embodiment, an air gap is formed between the first polarizer substrate and the second polarizer substrate.

In one embodiment, the air gap is devoid of any structural elements connecting the first polarizer substrate to the second polarizer substrate.

In one embodiment, the frame comprises an attaching portion for attaching the first and second polarizer substrates to the frame, and part of an inner planar surface of the first polarizer substrate and part of an inner planar surface of the second polarizer substrate are attached to the attaching portion, wherein portions of the respective inner planar surfaces disposed between the attaching portion are adhesive-free.

In one embodiment, the frame comprises an attaching portion for attaching the first and second polarizer substrates to the frame, and part of an inner planar surface of the first polarizer substrate and part of an inner planar surface of the second polarizer substrate are attached to the attaching portion, wherein portions of the respective inner planar surfaces disposed between the attaching portion are mechanically independent of each other.

In one embodiment, the polarizer further includes the planar antenna disposed adjacent to the RF polarizer.

In one embodiment, the polarizer comprises a circular form factor.

In one embodiment, the substrate comprises one of polyimide, polycarbonate, polyethylene terephthalate, or polyetherimide.

According to another aspect of the invention, an antenna system includes a plurality of the RF polarizers as described herein, and a scanning antenna including an aperture and feed, wherein the scanning antenna is arranged relative to the plurality of polarizers to communicate RF signals between the aperture and the plurality of polarizers.

In one embodiment, the scanning antenna comprises a variable inclination continuous transverse stub (VICTS) antenna.

According to another aspect of the invention, a method for forming a radio frequency (RF) polarizer includes: providing a frame having a first side and a second side spaced apart from and opposite the first side; attaching to the first side of the frame a first polarizer substrate including a plurality of conductor patterns; and attaching to the second side of the frame a second polarizer substrate, wherein attaching the first and second polarizer substrates includes placing the first and second polarizer substrates under tension.

In one embodiment, placing the first and second polarizer substrates under tension includes applying substantially the same tension to both the first and second polarizer substrates.

In one embodiment, applying substantially the same tension comprises applying a tension of about 2000 psi.

In one embodiment, attaching includes attaching part of inner planar surfaces of the first and second polarizer substrates to an attaching portion of the frame, and maintaining portions of the respective inner planar surfaces disposed between the attaching portion adhesive-free.

In one embodiment, attaching includes attaching part of inner planar surfaces of the first and second polarizer substrates to an attaching portion of the frame, and maintaining portions of the respective inner planar surfaces disposed between the attaching portion mechanically independent of each other.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DETAILED DESCRIPTION OF INVENTION

Figure 1:
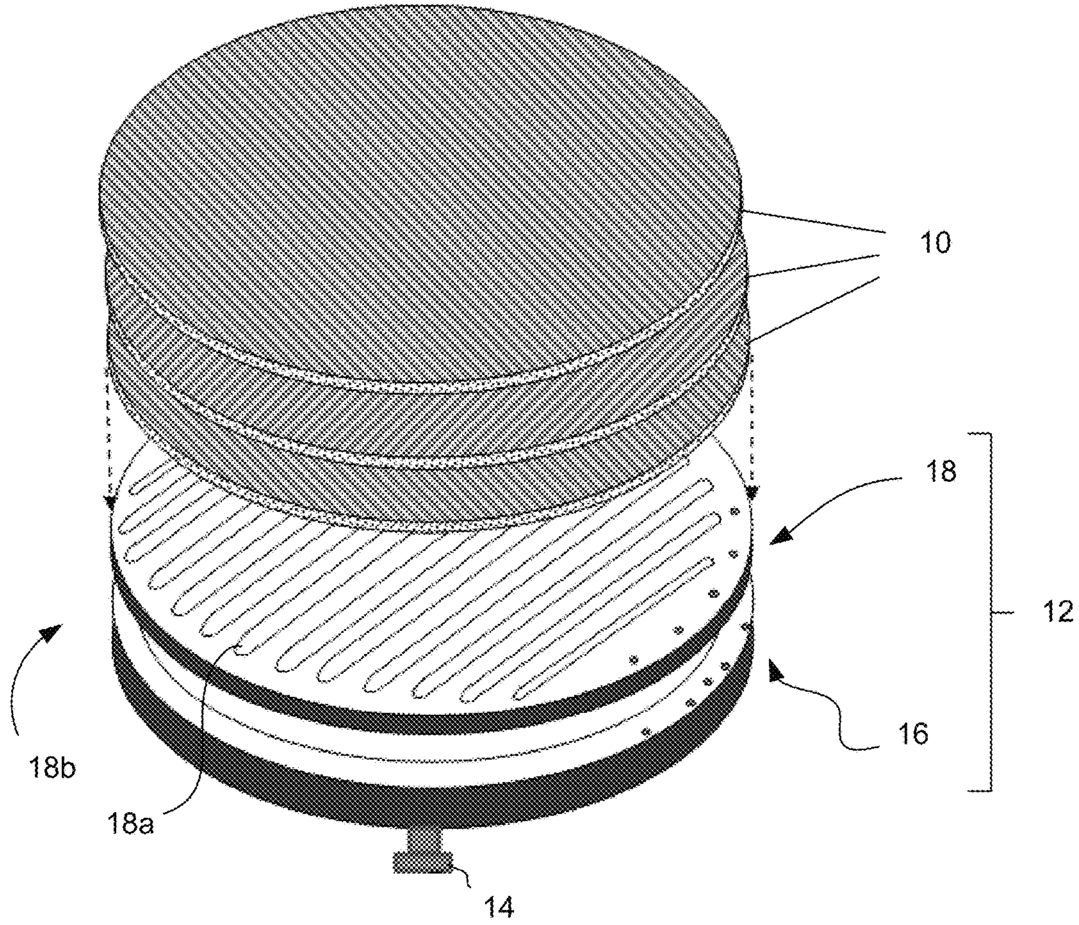
FIG. 1 illustrates an exploded view of an antenna system that utilizes conventional polarizers with a VICTS antenna.

Embodiments of the present invention will now be described with reference to the drawings, wherein like reference numerals are used to refer to like elements throughout. It will be understood that the figures are not necessarily to scale. \

The word "about" when immediately preceding a numerical value means a range of plus or minus 10% of that value, e.g., "about 50" means 45 to 55, "about 25,000" means 22,500 to 27,500, etc., unless the context of the disclosure indicates otherwise, or is inconsistent with such an interpretation. For example, in a list of numerical values such as "about 49, about 50, about 55, "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

The present invention finds utility in Variable Inclination Continuous Transverse Stub (VICTS) antenna systems and therefore will be described chiefly in this context. However, aspects of the invention are also applicable to other scanning planar antenna systems, including but not limited to electronically-scanned slotted planar arrays, printed patch arrays, open-ended waveguide arrays, or the like.

A VICTS antenna, in its simplest form, includes two components, namely an aperture and a feed. Antenna main beam scanning in θ (elevation) is achieved via rotation of the aperture with respect to the feed. This type of rotation also scans the antenna main beam over a small range of ϕ (azimuth), while additional desired scanning in ϕ is achieved by rotating the aperture and feed simultaneously, leading to near hemispherical scan coverage.

Figure 2:
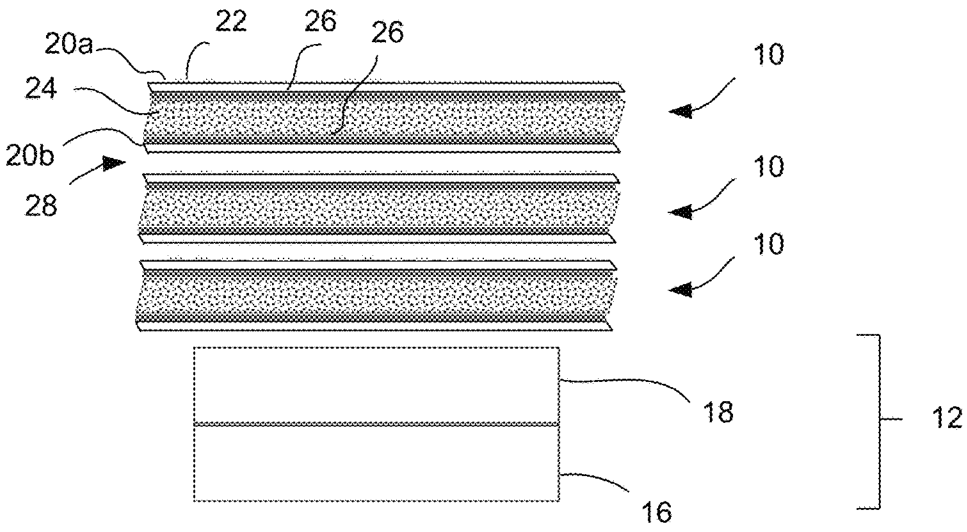
FIG. 2 is a side view of the antenna system of FIG. 1.

With reference to FIGS. 1 and 2, illustrated is an exploded view (FIG. 1) and a side view (FIG. 2) of a conventional stack of polarizers 10 and a planar scanning antenna 12 including an aperture and feed (e.g., a VICTS antenna), the scanning antenna 12 arranged relative to the polarizers 10 to communicate RF signals between the aperture and the polarizers. As shown, the antenna 12 and polarizers 10, which may be mounted to a spindle or other device that enables relative rotation between the respective polarizers about a common axis, each have a circular form factor and are concentric with each other. While other form factors are possible, due to the relative-rotation capability of the polarizers 10 with respect to each other and to the antenna 12, a circular form factor is best suited for minimizing the overall size of the system while at the same time providing optimal performance.

The antenna 12, which in the illustrated embodiment is a VICTS antenna, includes an antenna port 14 for receiving/outputting an RF signal, and lower and upper conducting plates 16 and 18 as is conventional. The upper conducting plate 18 includes a plurality of stubs 18*a* that define an aperture 18*b* of the VICTS antenna 12. It is noted that the embodiment illustrated in FIGS. 1 and 2 is merely exemplary, and other embodiments are envisioned. For example, embodiments with a different number of polarizers 10 and/or a different scanning antenna 12 are possible and may be used in place of those shown in FIGS. 1 and 2.

Figure 3:
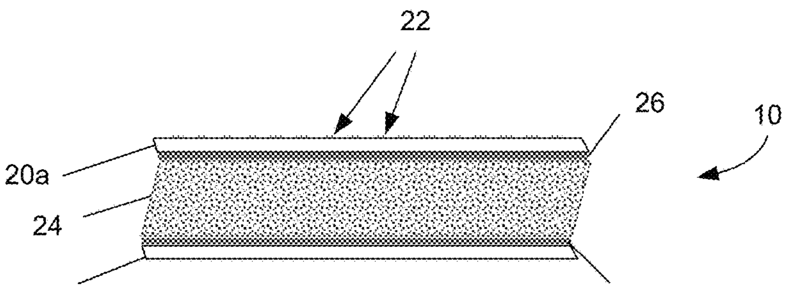
FIG. 3 is a detailed side view of a conventional polarizer showing the foam and adhesive layers between polarizer substrates.

With additional reference to FIG. 3, each polarizer 10 includes an upper substrate 20*a* and a lower substrate 20*b*, the upper substrate 20*a* including, for example, metal meanderline or gridline geometries 22. The upper and lower substrates are approximately 0.001 to 0.003 inches thick and are formed from a thin film material. For example, the substrates can be formed from one of polyimide (Kapton®), polycarbonate (Lexan®), polyethylene terephthalate (Mylar®), or polyetherimide (Ultem™). Arranged between the upper and lower substrates 20*a*, 20*b* is a foam spacer 24 having a thickness of about 0.1 inches, the foam spacer bonded to the upper and lower substrates 20*a*, 20*b* with an adhesive 26 that is approximately 0.003 inches thick. An air gap 28 is formed between adjacent polarizers 10.

As discussed above, the adhesive 26 and foam spacer 24 can reduce efficiency of the polarizer and thus of the antenna system. A device and method in accordance with the invention provide a design and construction of polarizers, such as gridline and meanderline polarizers, for CTS and VICTS antennas that improve antenna performance and utilize fewer materials. In accordance with the invention, dielectric substrate layers that are either blank or support the gridline and meanderline geometries are stretched adequately during assembly such that they remain under tension and thus remain entirely flat under all operational conditions. This is particularly important in harsh ground and airborne operational environments where the antennas are required to operate over wide temperature ranges and high humidity conditions. By maintaining flat dielectric layers under all operational conditions, predictable and consistent polarization performance is achieved.

Adequate stretch of the of the polarizer substrate is achieved by the following steps: 1) determining the substrate variation in tension that will occur over operational temperature extremes, which is a function of the coefficient of thermal expansion (CTE) of the ring frame, CTE of the substrate, maximum & minimum temperature that the polarizer is intended to operate, and overall dimension of both parts, 2) determining the substrate variation in tension that will occur over operational humidity extremes, which is a function of the humidity expansion coefficient of the substrate, absolute humidity of the environment at each extreme (dry & humid), and overall dimension of the substrate, 3) combining the temperature and humidity variations in tension at each extreme to determine the maximum variation in tension of the substrate, and 4) selecting an initial room condition tension of the substrate that will i) ensure there is still residual tension in the substrate at one end of variation range (to prevent sag of the substrate between the minimum and maximum temperatures of operation), and ii) ensure the tension at the other end of the variation range does not exceed the substrate tensile strength (to prevent structural failure of the substrate between the minimum and maximum temperatures of operation).

A benefit and improvement relative to the conventional polarizer designs is that the intermediate supporting foam spacer 24 and adhesive layers 26 of are eliminated, as the essential dielectric substrate layers are stretched and attached directly to a support frame or ring. The elimination of the foam spacer and adhesive layers directly improves the antenna performance by reducing the dielectric losses internal to the polarizer and obviates any concerns with respect to moisture entrapment or outgassing as associated with traditional "bonded foam" embodiments.

The support frame/ring with stretched dielectric substrate layer(s) can then be attached to each other to achieve a multilayer design or can be attached directly to another part of the antenna structure. In addition, the laminated "dual-substrate" structure provides superior surface wave suppression and control, particularly at larger angles of incidence (larger scan angles) where this novel "paired" boundary structure enables superior transmission and polarization properties, as compared to conventional construction methods. Further, the absence of the conventional adhesive layers (typically 3-4 mils in thickness each, and present at both substrate-to-foam and foam-to-substrate interfaces in the conventional embodiment) provides for superior performance at higher frequencies (30 GHz and above) where the presence of the adhesive layers in conventional polarizer embodiments can further degrade the overall electrical properties (transmission loss and polarization purity) at these higher operating frequencies.

A stretched polarizer in accordance with the invention, in its simplest form, includes two dielectric substrate membranes bonded to opposite faces of a thin metal ring, where the thickness of the ring is sized to satisfy the separation distance requirement based on RF electrical performance considerations (polarization purity, transmission loss, and surface wave control.) More complex designs can consist of stacked stretched polarizers.

The polarizer design in accordance with the invention relies on the membrane tension and the flatness of the perimeter ring to maintain the flat shape of the polarizer. More particularly, the flatness of the novel stretched polarizer is dictated and maintained by the flatness of the perimeter ring and/or the flatness of the structure to which it is attached. The effects of differential expansion do not affect the flatness of the polarizer as long as there is sufficient tension in the dielectric substrate layers. This is achieved by pre-tensioning the dielectric substrate layers during manufacturing to a level that is sufficient to accommodate a partial loss of tension due to differential expansion effects. A "partial loss of tension" means that the tension in the substrate has decreased from a nominal tension, but the substrate is still under tension. Additionally, the foam spacer and adhesive layers are eliminated in the stretched polarizer design, which improves RF performance.

Figure 4A:
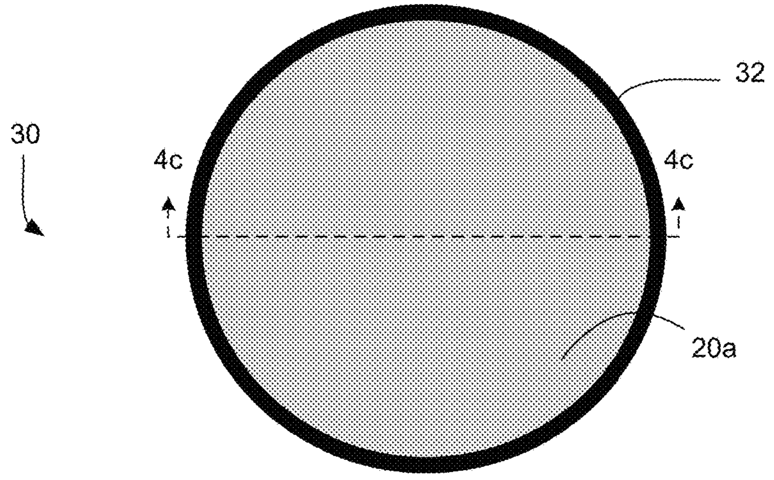
FIG. 4A is a top view of an exemplary polarizer in accordance with the invention.
Figure 4B:
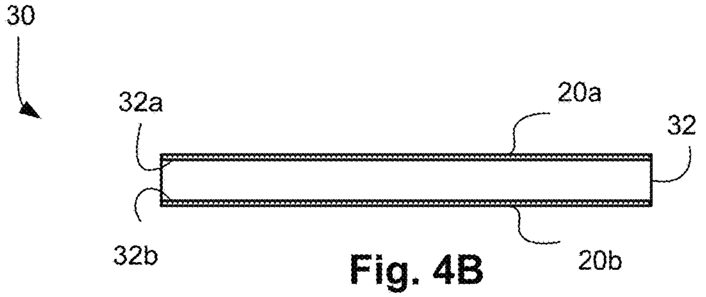
FIG. 4B is a side view of the polarizer of FIG. 4A.
Figure 4C:
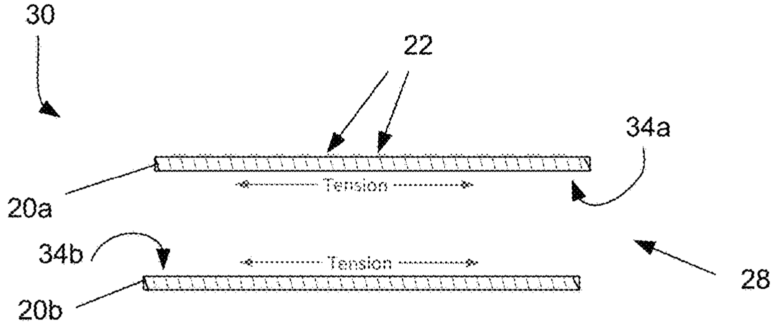
FIG. 4C is a detailed partial side view of the polarizer of FIGS. 4A and 4B.

Referring to FIGS. 4A-4C, illustrated are top, side, and detailed section views of an exemplary polarizer 30 in accordance with the invention. The polarizer 30 includes a frame 32 having a first side 32*a* and a second side 32*b* spaced apart from and opposite the first side 32*a*. In the illustrated embodiment the frame 32 is formed as a circular ring, although other shapes, such as rectangular, elliptical etc., are possible. A circular ring is preferred as it provides the minimum footprint as the polarizer is rotated about its axis. The frame may be formed from any number of different materials of sufficient strength but is typically formed from metal such as aluminum or steel.

A first polarizer substrate 20*a* that includes a plurality of conductor patterns, such as meanderline conductor patterns or gridline conductor patterns, is attached to the first side 32*a* of the frame 32. A second polarizer substrate 20*b* that is blank or includes a plurality of conductor patterns (e.g., meanderline conductor patterns or gridline conductor patterns) is attached to the second side 32*b* of the frame 32. In attaching the first and second substrates, according to one embodiment the frame may include attaching portions, e.g., grip sections and/or clamping means, for fixedly holding the respective substrates on the frame 32. According to another embodiment, an adhesive may be used to bond the substrate to the ring frame to mitigate any reduction in the pre-tensioning that may occur over time. A combination of grip/clamping sections and adhesive also may be used.

Both the first polarizer substrate 20*a* and the second polarizer substrate 20*b* are stretched across and attached to the frame 32 under tension. More specifically, the first polarizer substrate 20*a* is fixed to the first side 32*a* of the frame 32 at a first tension, and the second polarizer substrate 20*b* is fixed to the second side 32*b* of the frame 32 at a second tension. Preferably, the first tension is substantially the same as the second tension such that the stress applied by the respective substrates on the frame is effectively canceled. The actual tension depends on the application of the polarizer. For example, the tension can be based on one or more of an expected temperature range of operation, the substrate material of the polarizer, the frame material, the size of the frame, etc. Preferably, the tension at room temperature during bonding is at least 2000 psi for each substrate.

By attaching the substrates 20*a*, 20*b* to the frame 32 under tension, a foam spacer, and thus the corresponding adhesive that attaches the foam spacer to the substrates 20*a*, 20*b*, is not needed. Thus, an inner-most planar surface 34*a* of the first polarizer substrate 20*a* and an inner-most planar surface 34*b* of the second polarizer substrate 20*b* face each other such that exposed portions of the respective inner-most planar surfaces (i.e., portions of the respective substrates that are not attached to the frame 30) are adhesive-free, structurally independent of each other, mechanically independent of each other, and are separated by a gap, e.g., an air gap, between the entire exposed portions. Further, by attaching the two substrates 20*a*, 20*b* on opposite sides of the frame at about the same tension, the force applied to the frame 32 by the first (top) polarizer substrate 20*a* and the force applied to the frame 32 by the second (bottom) polarizer substrate 20*b* effectively cancel each other. Therefore, the frame does not tend to bend one way or the other.

Figure 5:
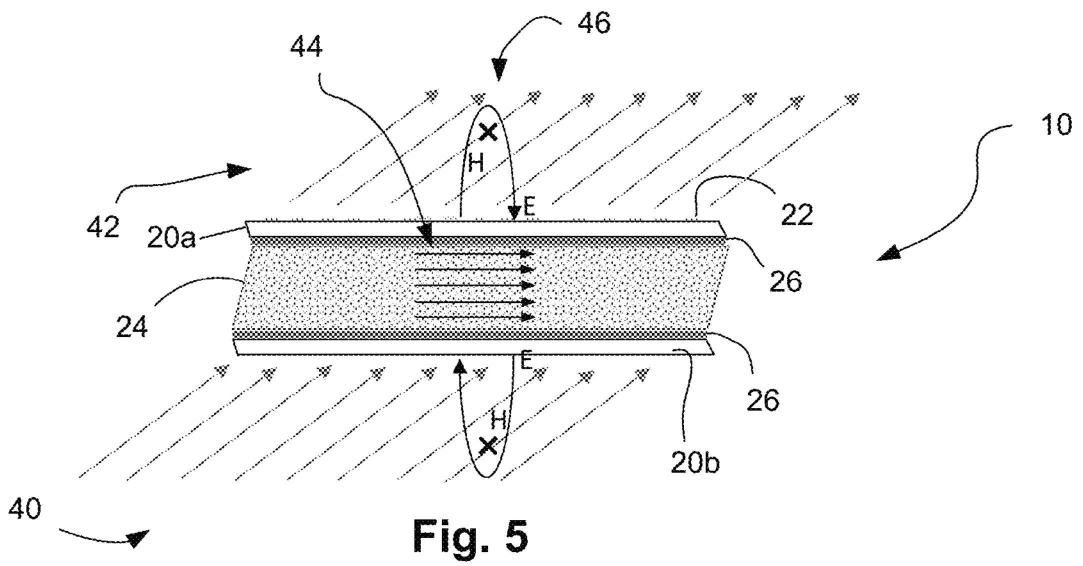
FIG. 5 is a cross section of a conventional polarizer showing plane wave control.

The polarizer in accordance with the invention provides improved performance relative to a conventional polarizer. More particularly, and with reference to FIG. 5, illustrated is a cross section of a plane wave 40 passing through a conventional polarizer having a foam layer 24 bonded to upper and lower substrates 20*a*, 20*b* with an adhesive 26. As illustrated, a plane wave 40 is incident on a first (bottom) surface of polarizer 10 produces a resultant plane wave 42 that exits a second (top) surface of the polarizer 10. Due to the dielectric refraction and guiding properties created by the foam layer 24 and adhesive 26, undesired surface waves 44 couple with the structure. Further, the relatively strong surface waves 44 produce magnetic and electric fields 46 about the polarizer 10 that are relatively large (i.e., they extend a substantial distance away from the surface of the top and bottom substrates in a direction normal to those surfaces), which may result in undesirable coupling with other metal structures in the vicinity of the polarizer 10.

Figure 6:
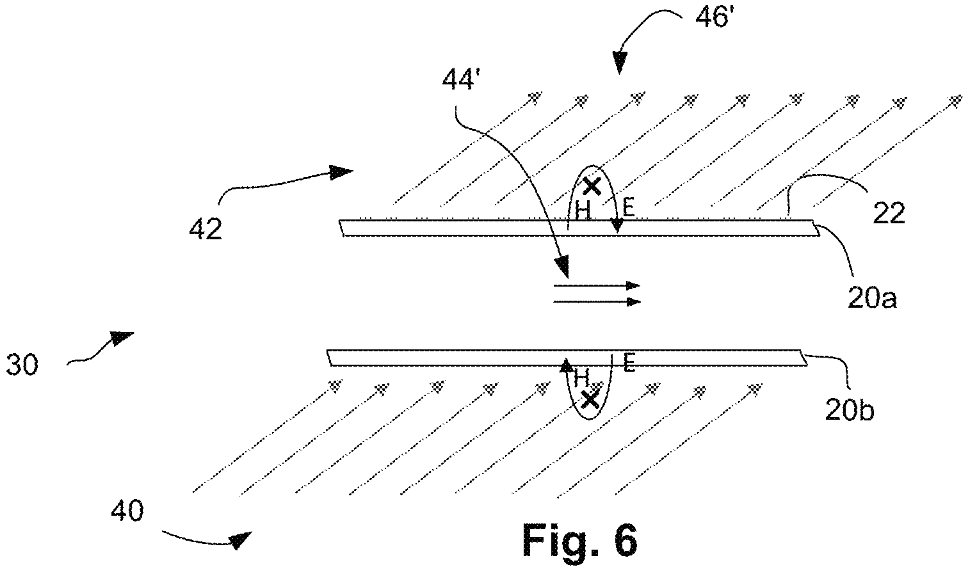
FIG. 6 is a cross section of a polarizer in accordance with the invention showing plane wave control.

In contrast to the polarizer of FIG. 5, a polarizer 30 in accordance with the invention provides significantly improved performance. More specifically, and with reference to FIG. 6, the absence of a foam layer and corresponding adhesive produces significantly lower surface waves 44', which in turn produces a tighter boundary for the magnetic and electric fields 46' (, i.e., the magnetic and electric fields do not extend as far away from the surface of the respective substrates and thus there is less chance of undesirable coupling with nearby objects).

To form the polarizer in accordance with the invention, a frame 32 is provided that has a first side 32*a* and a second side 32*b* spaced apart from and opposite the first side. A first polarizer substrate 20*a* including one of a plurality of meanderline conductor patterns or a plurality of gridline conductor patterns is attached to the first side 32*a* of the frame 32. In this regard, the polarizer substrate is stretched across the frame 32 equally in all directions, and portions of the substrate are fixed to the frame 32 while the substrate is in the stretched state. The substrate 20*a* may be fixed to the frame 32 using a fastening means, such as a clamping device, an adhesive, a threaded fastener, or a combination of such fastening means. Once the substrate 20*a* is fixed to the frame in the stretched state, the substrate 20*a* remains under tension. After the first substrate 20*a* is attached to the frame 32, a second substrate 20*b* then is attached to the second side 32*b* of the frame 32 in the same manner. That is, the second substrate 20*b* is stretched across the second side 32*b* of the frame 32 and fixed to the frame using the fastening means. In attaching the second substrate 20*b*, the tension of the second substrate should be the same or approximately the same (e.g., within 10%) of the tension of the first substrate.

Figure 7A:
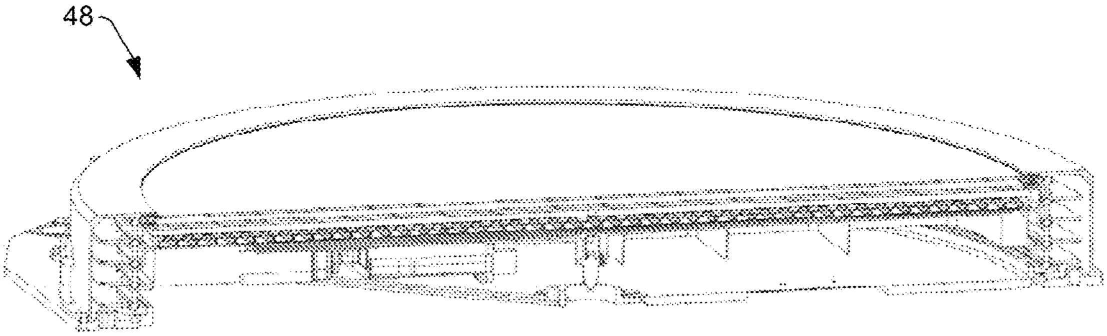
FIGS. 7A and 7B are sectional views of an exemplary antenna system using polarizers in accordance with the invention.
Figure 7B:
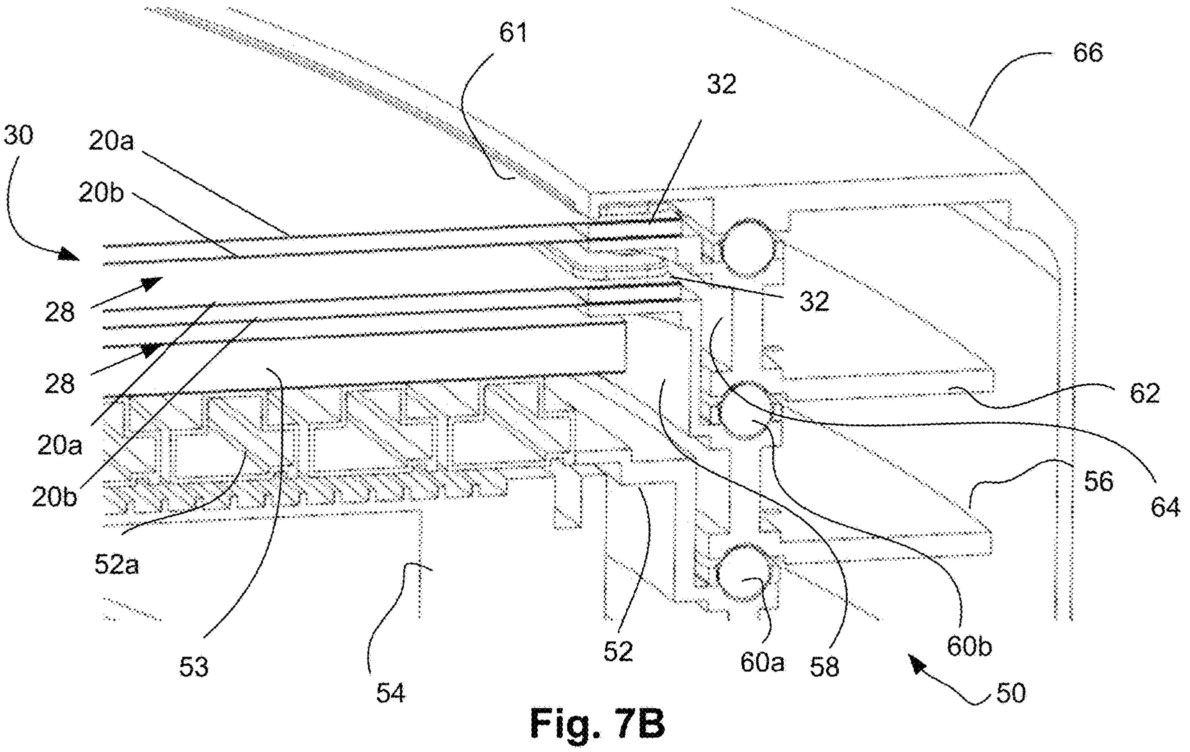

Referring to FIGS. 7A and 7B, illustrated is a sectional view of an exemplary antenna system 48 utilizing a polarizer 30 in accordance with the invention. The antenna system 48 includes a VICTS antenna 50 having a first (upper) conductive plate 52 having continuous transverse stubs 52*a*, and a second (lower) conductive plate 54 spaced apart from the first conductive plate 52.

Mounted on the first conductive plate 52 on top of the continuous transverse stubs 52*a* is a first polarizer assembly 53 constructed via conventional means. Mounted above the first polarizer assembly 53 is a second polarizer assembly 56 that includes a support structure 58 having a polarizer 30 according to the invention attached thereto and a clamp 61 that is used to affix the polarizer 30 to the support structure 58 using fasteners (not shown). A bearing 60*a* is arranged in races of the first conductive plate 52 and the support structure 58, the bearing enabling relative rotation between the second polarizer assembly 56 and the first polarizer assembly 53 and upper conductive plate 52.

Mounted on the second polarizer assembly 56 is a third polarizer assembly 62 that includes a support structure 64 having a polarizer 30 according to the invention attached thereto and a clamp 61 that is used to affix the polarizer 30 to the support structure 58 using fasteners (not shown). Another bearing 60*b* is arranged in races of the second polarizer assembly 56 and the third polarizer assembly 62, the bearing enabling relative rotation between the second polarizer assembly 56 and the third polarizer assembly 62. The VICTS antenna 50, the second polarizer assembly 56 and the third polarizer assembly 62 are mounted within a housing 66.

Accordingly, a polarizer in accordance with the invention not only provides enhanced performance, but also requires less components. In particular, the polarizer in accordance with the invention does not include a foam spacer and the corresponding adhesive layers, which reduces losses through the polarizer.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

What is claimed is:

1. A radio frequency (RF) polarizer, comprising: a frame having a first side and a second side spaced apart from and opposite the first side; a first polarizer substrate attached to the first side and including a plurality of conductor patterns formed on a surface of the first polarizer substrate; and a second polarizer substrate attached to the second side, wherein the first polarizer substrate and the second polarizer substrate are attached to the first side and the second side, respectively, under tension such that a first bending force applied to the frame by the first polarizer substrate and a second bending force applied to the frame by the second polarizer substrate effectively cancel each other.

2. A radio frequency (RF) polarizer, comprising:

a frame having a first side and a second side spaced apart from and opposite the first side;

a first polarizer substrate attached to the first side and including a plurality of conductor patterns formed on a surface of the first polarizer substrate; and a second polarizer substrate attached to the second side, wherein an inner-most planar surface of the first polarizer substrate and an inner-most planar surface of the second polarizer substrate face each other, and exposed portions of the respective inner-most planar surfaces are structurally independent of each other, and wherein the first side comprises a first outer-most surface of the frame and the second side comprises a second outer-most surface of the frame, the second outer-most surface disposed opposite the first outer-most surface, and wherein the first polarizer substrate is directly attached to the first outer-most surface and the second polarizer substrate is directly attached to the second outer-most surface.

3. The RF polarizer according to claim 1, wherein the conductor patterns are formed on an outer-most surface of at least the first polarizer substrate.

4. The RF polarizer according to claim 1, wherein the plurality of conductor patterns comprise at least one of meanderline geometries or gridline geometries.

5. The RF polarizer according to claim 1, wherein the first polarizer substrate is fixed to the first side of the frame at a first tension, and the second polarizer substrate is fixed to the second side of the frame at a second tension, the first tension substantially the same as the second tension.

6. The RF polarizer according to claim 5, wherein the first and second tension are about 2000 psi.

7. The RF polarizer according to claim 1, wherein an air gap is formed between the first polarizer substrate and the second polarizer substrate.

8. The RF polarizer according to claim 7, wherein the air gap is devoid of any structural elements connecting the first polarizer substrate to the second polarizer substrate.

9. The RF polarizer according to claim 1, wherein the frame comprises an attaching portion for attaching the first and second polarizer substrates to the frame, and part of an inner planar surface of the first polarizer substrate and part of an inner planar surface of the second polarizer substrate are attached to the attaching portion, wherein portions of the respective inner planar surfaces disposed between the attaching portion are adhesive-free.

10. The RF polarizer according to claim 1, wherein the frame comprises an attaching portion for attaching the first and second polarizer substrates to the frame, and part of an inner planar surface of the first polarizer substrate and part of an inner planar surface of the second polarizer substrate are attached to the attaching portion, wherein portions of the respective inner planar surfaces disposed between the attaching portion are mechanically independent of each other.

11. The polarizer according to claim 1, further comprising a planar antenna disposed adjacent to the RF polarizer.

12. The polarizer according to claim 1, wherein the polarizer comprises a circular form factor.

13. The polarizer according to claim 1, wherein at least one of the first polarizer substrate or the second polarizer substrate comprises one of polyimide, polycarbonate, polyethylene terephthalate, or polyetherimide.

14. An antenna system, comprising:

a plurality of the RF polarizers according to claim 1; and a scanning antenna including an aperture and feed, wherein the scanning antenna is arranged relative to the plurality of polarizers to communicate RF signals between the aperture and the plurality of polarizers.

15. The antenna system according to claim 14, wherein the scanning antenna comprises a variable inclination continuous transverse stub (VICTS) antenna.

16. A method for forming a radio frequency (RF) polarizer, comprising: providing a frame having a first side and a second side spaced apart from and opposite the first side; attaching to the first side of the frame a first polarizer substrate including a plurality of conductor patterns; and attaching to the second side of the frame a second polarizer substrate, wherein attaching the first and second polarizer substrates includes placing the first and second polarizer substrates under tension such that a first bending force applied to the frame by the first polarizer substrate and a second bending force applied to the frame by the second polarizer substrate effectively cancel each other.

17. The method according to claim 16, wherein placing the first and second polarizer substrates under tension includes applying substantially the same tension to both the first and second polarizer substrates.

18. The method according to claim 17, wherein applying substantially the same tension comprises applying a tension of about 2000 psi.

19. The method according to claim 16, wherein attaching includes attaching part of inner planar surfaces of the first and second polarizer substrates to an attaching portion of the frame, and maintaining portions of the respective inner planar surfaces disposed between the attaching portion adhesive-free.

20. The method according to claim 16, wherein attaching includes attaching part of inner planar surfaces of the first and second polarizer substrates to an attaching portion of the frame, and maintaining portions of the respective inner planar surfaces disposed between the attaching portion mechanically independent of each other.

21. The polarizer according to claim 1, wherein the second side of the frame is immediately adjacent to the first side of the frame.

22. The polarizer according to claim 1, wherein the first side comprises a first outer-most surface of the frame and the second side comprises a second outer-most surface of the frame, the second outer-most surface disposed opposite the first outer-most surface, and wherein the first polarizer substrate is attached to the first outer-most surface and the second polarizer substrate is attached to the second outer-most surface.

23. The polarizer according to claim 1, wherein the second polarizer substrate is void of conductor patterns.

24. The polarizer according to claim 1, wherein the first bending force and the second bending force cancel each other such that the frame does not tend to bend one way or the other.

* * * * *